United States Patent
Agarwal et al.

(10) Patent No.: US 10,581,795 B2
(45) Date of Patent: Mar. 3, 2020

(54) SYSTEMS AND METHODS FOR DYNAMICALLY SELECTING A COMMUNICATION IDENTIFIER

(71) Applicant: Google Inc., Mountain View, CA (US)

(72) Inventors: Amit Agarwal, Mountain View, CA (US); Daniel Alf Andersson, Mountain View, CA (US); Anshul Kothari, Mountain View, CA (US)

(73) Assignee: Google LLC, Mountain View, CA (US)

( * ) Notice: Subject to any disclaimer, the term of this patent is extended or adjusted under 35 U.S.C. 154(b) by 241 days.

(21) Appl. No.: 14/936,883

(22) Filed: Nov. 10, 2015

(65) Prior Publication Data

US 2017/0104713 A1    Apr. 13, 2017

Related U.S. Application Data

(60) Provisional application No. 62/238,643, filed on Oct. 7, 2015.

(51) Int. Cl.
*H04L 29/12* (2006.01)
*G06Q 30/02* (2012.01)
(Continued)

(52) U.S. Cl.
CPC ........... *H04L 61/106* (2013.01); *G06Q 10/10* (2013.01); *G06Q 30/02* (2013.01); *H04L 61/605* (2013.01); *H04L 65/1069* (2013.01); *H04L 67/02* (2013.01); *H04L 67/18* (2013.01); *H04M 7/0075* (2013.01)

(58) Field of Classification Search
None
See application file for complete search history.

(56) References Cited

U.S. PATENT DOCUMENTS

| 7,424,442 B2 | 9/2008 | Wong et al. |
| 7,555,106 B2 | 6/2009 | Kumar |

(Continued)

OTHER PUBLICATIONS

Google AdWords. Add forwarding numbers for advanced call reporting. https://support.google.com/adwords/answer/2454052?hl=en.

(Continued)

*Primary Examiner* — Gregory B Sefcheck
*Assistant Examiner* — Jenkey Van
(74) *Attorney, Agent, or Firm* — Foley & Lardner LLP

(57) ABSTRACT

The present disclosure can select a communication identifier for a device of a content provider. A system receives a request for content for display. The system identifies a content item responsive to the request. The system determines a feature of the computing device and a feature of the content item. The system selects a type of phone number for a content provider of the content item based on both the feature of the computing device and the feature of the content item. The system identifies a phone number for the content item corresponding to the type of phone number. The system transmits the phone number for the content item for display via a computing device. The system identifies, responsive to an indication to establish a communication corresponding to the phone number for the content item, a phone number for the device of the content provider.

16 Claims, 4 Drawing Sheets

(51) Int. Cl.
*G06Q 10/10* (2012.01)
*H04L 29/06* (2006.01)
*H04L 29/08* (2006.01)
*H04M 7/00* (2006.01)

(56) References Cited

U.S. PATENT DOCUMENTS

| | | | | |
|---|---|---|---|---|
| 8,577,016 B1* | 11/2013 | Duva | ............... | G06Q 10/00 379/201.01 |
| 8,732,322 B1* | 5/2014 | Agrawal | ............ | G06Q 30/0251 705/14.45 |
| 8,934,614 B2 | 1/2015 | Altberg et al. | | |
| 9,087,336 B2 | 7/2015 | Faber et al. | | |
| 2003/0004802 A1* | 1/2003 | Callegari | .......... | G06F 17/30241 705/14.13 |
| 2005/0251445 A1* | 11/2005 | Wong | ............ | G06Q 30/02 705/14.69 |
| 2007/0121848 A1* | 5/2007 | Faber | ............ | G06Q 30/02 379/114.13 |
| 2008/0097845 A1* | 4/2008 | Altberg | ............. | G06Q 30/02 705/14.61 |
| 2009/0060148 A1* | 3/2009 | Jacob | ............ | G06Q 30/02 379/88.04 |
| 2011/0282739 A1 | 11/2011 | Mashinsky et al. | | |
| 2012/0054027 A1* | 3/2012 | McAfee | ............. | G06Q 30/0251 705/14.49 |
| 2013/0066656 A1* | 3/2013 | Hanson | ................ | G06Q 40/08 705/4 |
| 2015/0066633 A1 | 3/2015 | Agrawal et al. | | |
| 2015/0278860 A1 | 10/2015 | Rayanchu | | |
| 2015/0301696 A1* | 10/2015 | D' Jesus Bencci | ... | G06F 3/0482 715/752 |
| 2016/0042323 A1* | 2/2016 | Moran | ............... | G06Q 10/1053 705/321 |
| 2017/0118632 A1* | 4/2017 | Paiement | .......... | H04M 3/42348 |

OTHER PUBLICATIONS

Google Inside AdWords. Google forwarding numbers arrive in Canada http://adwords.blogspot.com/2015/09/google-forwarding-numbers-arrive-in.html.
International Search Report and Written Opinion for PCT Appl. Ser. No. PCT/US2016/049131 dated Nov. 9, 2016 (11 pages).
Communication pursuant to Article 94(3) EPC for EP Application No. 16760346.3 dated Apr. 9, 2019 (6 pages).
International Preliminary Report on Patentability for PCT/US2016/049131 dated Apr. 19, 2018 (8 pages).

* cited by examiner

SYSTEMS AND METHODS FOR DYNAMICALLY SELECTING A COMMUNICATION IDENTIFIER

CROSS-REFERENCES TO RELATED APPLICATIONS

This application claims the benefit of priority under 35 U.S.C. § 119 to U.S. Provisional Patent Application No. 62/238,643, filed on Oct. 7, 2015, which is hereby incorporated by reference herein in its entirety.

BACKGROUND

In a networked environment such as the Internet, entities such as people or companies provide information for display on web pages or other interface by a computing device. The web pages can include text, video, or audio information provided by the entities via a web page server for display on the Internet. Additional content such as electronic advertisements can also be provided by third parties for display on the web pages together with the information provided by the entities. Thus, a person viewing a web page can access the information that is the subject of the web page, as well as selected third party advertisements that may or may not be related to the subject matter of the web page.

SUMMARY

Systems and methods of the present disclosure are directed to dynamically selecting a communication identifier, such as a phone number, device identifier, or call handle. The present disclosure can dynamically select a type of phone number (e.g., local number, toll free number, premium phone number, or shared cost phone number) for display with an online content item, such as an advertisement. The present disclosure can include the dynamically selected phone number in an online advertisement when presenting the online advertisement for display via a computing device. The present disclosure can select the phone number based on a metric, such as a likelihood of conversion or a cost of the phone call. To select the phone number, the present disclosure can use information about or associated with the computing device, advertisement, or business.

For example, the present disclosure includes one or more parameters or fields in a content campaign data structure that allow a content provider to set a value that causes a data processing system to select or choose a type of phone number to provide with a content item. The type of phone number can be configured based on selection logic or parameters, such as geographic location of a computing device, keywords that match search queries, entity type, calling charges, type of call (e.g., a sales call or a service call). The data processing system can dynamically select the phone number such that a content provider would not have to change their existing phone number. For example, responsive to a search input to a search or affiliated webpage, the data processing system can select a content item for the content provider and dynamically select a type of phone number. The data processing system can select a phone number corresponding to the selected type of phone number. The selected phone number, when called by a computing device, can cause the data processing system to connect the call to the content provider's phone number. The data processing system can be configured to perform this technique. For example, the data processing system can choose the type of phone number, based on one or more of the following selection techniques: if the content provider has a local number, then the data processing system 120 can select a local phone number instead of a toll free number; if the content provider has a toll-free number, the data processing system 120 can allocate a toll-free number; determine the type of phone number (local number, local number to the computing device, or toll free number) based on the geographic location of the computing device; determine if a search query entered by the computing device corresponds to a service request, and if so, select a share cost or premium phone number; determine if call is for sales request based on search query, and, if so, select a local number of toll free number; or determine call charges in a given region and then determine whether to use a local number, toll free number or shared cost number, which may be based on a bid amount for the content item set by the content provider.

At least one aspect is directed to a method of selecting a communication identifier for a device of a content provider using a computer network. The method can be performed by one or more processors of a data processing system. The data processing system can include components such as a number allocator, multiplexer and bridging module. The method can include the data processing system receiving a request for content for display via a computing device. The method can include the data processing system identifying a content item provided by the content provider. The data processing system can identify the content responsive to the request for content. The method can include the data processing system determining a feature of the computing device. The method can include the data processing system determining a feature of the content item. The method can include the data processing system selecting a type of phone number for the content provider based on both the feature of the computing device and the feature of the content item. The method can include the data processing system identifying a phone number for the content item corresponding to the type of phone number. The method can include the data processing system transmitting, via the computer network, the phone number for the content item to the computing device for display with the content item via the computing device. The method can include the data processing system identifying phone number for the device of the content provider using a multiplex data structure. The phone number for the device can be different from the phone number for the content item. The data processing system can identify the phone number responsive to receiving an indication to establish a communication channel corresponding to the phone number for the content item. The method can include the data processing system establishing the communication channel corresponding to the phone number of the content item. The communication channel can be between the computing device and the device of the content provider.

Another aspect is directed to a system to select a communication identifier for a device of a content provider using a computer network. The system can include a data processing system having one or more processors and memory. The data processing system can include an interface, a number allocator, a multiplexer, and a bridging module. The data processing system can receive a request for content for display via a computing device. The data processing system can identify, responsive to the request, a content item provided by the content provider. The data processing system can determine a feature of the computing device. The data processing system can determine a feature of the content item. The number allocator can select a type of phone number for the content provider based on both the feature of the computing device and the feature of the content item. The number allocator can identify a phone number for the content item corresponding to the type of phone number. The number allocator can transmit, via the computer network, the phone number for the content item to the computing device for display with the content item via the computing device. The multiplexer can identify, responsive to receiving an indication to establish a communication channel corresponding to the phone number for the content item, a phone number for the device of the content provider using a multiplex data structure. The phone number for the device can be different from the phone number for the content item. The bridging module can establish, between the computing device and the device of the content provider, the communication channel corresponding to the phone number of the content item.

Yet another aspect is directed to a non-transitory computer readable medium having instructions to select a communication identifier for a device of a content provider using a computer network. The instructions can include instructions to receive a request for content for display via a computing device. The instructions can include instructions to identify, responsive to the request, a content item provided by the content provider. The instructions can include instructions to determine a feature of the computing device. The instructions can include instructions to determine a feature of the content item. The instructions can include instructions to select a type of phone number for the content provider based on both the feature of the computing device and the feature of the content item. The instructions can include instructions to identify a phone number for the content item corresponding to the type of phone number. The instructions can include instructions to transmit, via the computer network, the phone number for the content item to the computing device for display with the content item via the computing device. The instructions can include instructions to identify, responsive to receiving an indication to establish a communication channel corresponding to the phone number for the content item, a phone number for the device of the content provider using a multiplex data structure. The phone number for the device can be different from the phone number for the content item. The instructions can include instructions to establish, between the computing device and the device of the content provider, the communication channel corresponding to the phone number of the content item.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
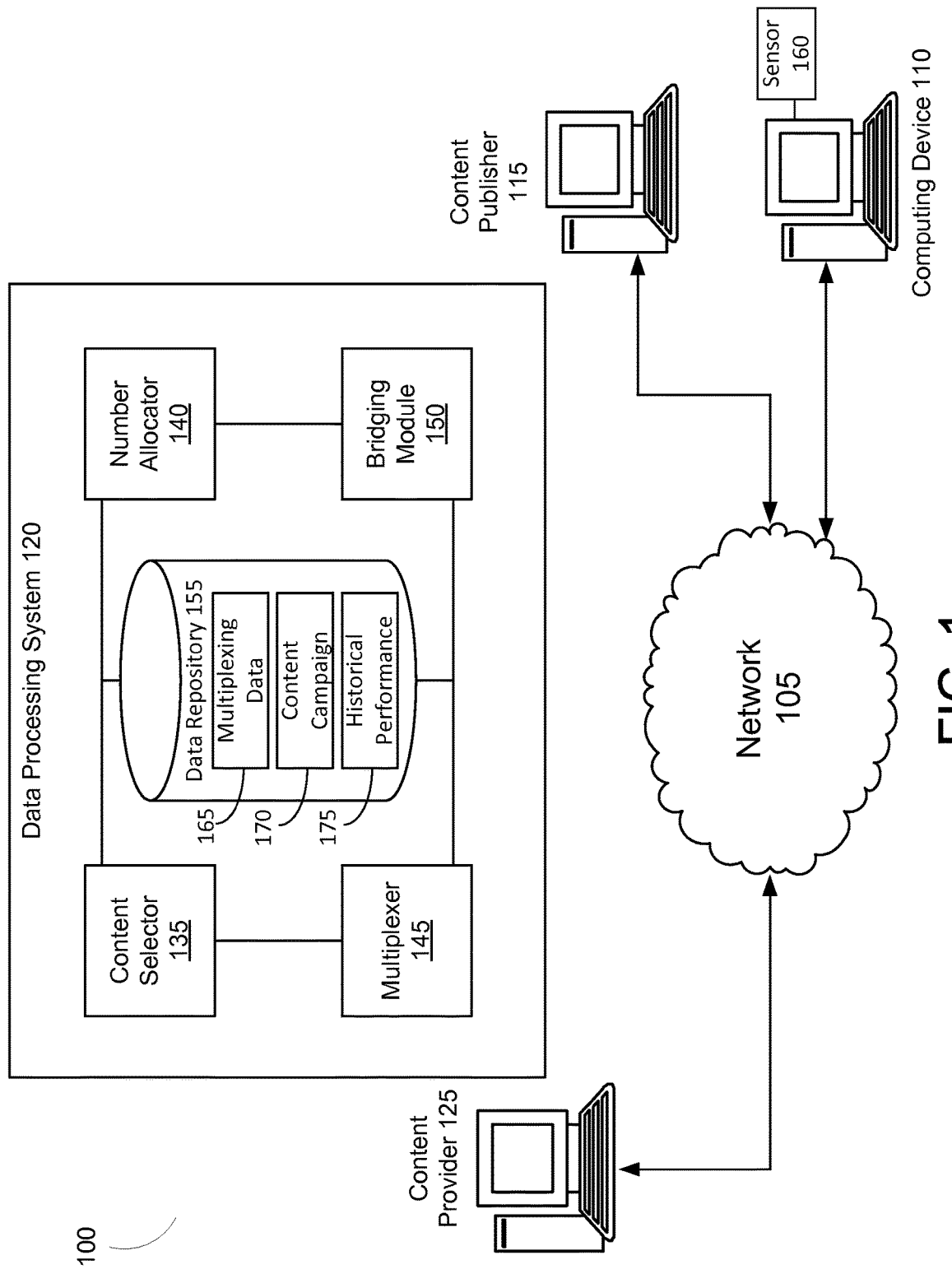
FIG. 1 is an illustration of a system to select a communication identifier for a device of a content provider in accordance with an implementation.

The systems and methods described herein relate to selecting a type phone number for display with an online content item, such as a call content item or call advertisement that includes or provides a phone number of call button. For example, a data processing system can select a type phone number based on features associated with a caller computing device, content item, or web page. The data processing system can select the type of phone number responsive to a request and using a selection technique. Types of phone numbers can include, for example, a local number, a toll free number, a premium phone number, or a shared cost phone number. The data processing system can identify a phone number corresponding to the dynamically selected type phone number. Dynamically selecting the type of phone number can refer to selecting the type of phone number using features associated with one or more of the computing device, content item, or web page, and in responsive to a request for the content item or phone number. Dynamically selecting the type of phone number allows the data processing system to select a type of phone number based on information associated with the content item impression, rather than using a static phone number that is preset for the content item. The data processing system can include the identified phone number in an online content item (e.g., an online advertisement) when electronically presenting the online content item for display via a computing device. In some cases, the systems and methods described herein can select the type of phone number based on one or more factors or features. For example, the data processing system can select the type of phone number based on a technique that improves or optimizes a metric associated with the content item, such as a likelihood of selection or conversion. In some cases, the data processing system can select the type of phone number to reduce costs or fees incurred by one or more parties participating or associated with the phone call. To select the type of phone number, the data processing system can use information about or associated with the computing device, advertisement, or business.

For example, an entity such as a provider of goods or services can configure or maintain one or more devices with communication identifiers. A communication identifier can be associated with a communication channel or a type of communication channel. The communication identifier can refer to a phone number of a node in the communication channel. In some cases, the communication identifier can be assigned to a midpoint in the communication channel that is configured to receive a first call from a first point, initiate a second call to a second point, and bridge the two calls to establish the communication channel between the first point and the second point. The data processing system can use different types of communication channels that may provide different features including, e.g., as follows: a communication channel can be toll free in which in or more parties (e.g., the caller) may not incur charges, while the recipient may incur charges for use of the channel; a communication channel can be configured to cause the caller to incur fees, while the recipient may not incur fees; a communication channel can be configured to cause both the caller and recipient to incur fees; a communication channel can appear to be a local call.

Types of communication channels can be associated with a corresponding type of phone number. For example, a communication channel in which the caller may not incur charges can correspond to a toll free number such as an "800" number; a communication channel in which the caller incurs fees can be a premium number such as a "900" number; a shared-cost service that provides an intermediate level of telephone call billing in which the charge for calling an international or long-distance phone number (e.g., "808", "0180", "09", "13") is partially, but not entirely, paid for by the recipient; a local phone number may be a phone number that includes an area code that corresponds to a geographic location that is near at least one of the computing device or the content provider.

The entity can select a predetermined type of phone number for display with a content item. However, it may be challenging to determine the type of phone number to select for a particular content item that is displayed on a particular web page and provided to a particular computing device. For example, the entity may prefer to provide a local phone number for display with content items. However, since the computing device requesting the content item could be located in any geographic location, challenges may arise due to a limited number of available numbers configured for use with call-enabled computing device and the limited amount of information available regarding a potential content request.

The present solution can include a data processing system that can receive a request for an online content item for display on a computing device. The data processing system can identify one or more features associated with the computing device (e.g., location, device type, phone number). The data processing system can identify one or more features associated with a web page with which the content item is to be presented (e.g., keyword, topic, search query entered via computing device, location, geography). The data processing system can identify one or more features associated with the content item (e.g., keyword, topic, search query entered via computing device, location of advertiser/business, phone number preferred by business). Based on these features, the data processing system can determine, identify, rank, weight, or select a type of phone number to increase a likelihood that the content item is interacted with (e.g., a click, selection, conversion, initiation of a phone call).

The data processing system can maintain a historical performance data structure storing performance information for previous advertisement impressions. The performance information can include, for each advertisement impression, anonymous data associated with the computing device on which the advertisement is displayed, web page information, and advertisement information. The performance information can further include, for each advertisement impression, a type of phone number provided for the advertisement, whether the advertisement was selected (e.g., a click), whether the phone number was dialed, or whether a conversion occurred. The system can train a machine learning model based on this historical performance information to identify a type of phone number that can optimize a metric, such as likelihood of conversion.

For example, content providers (e.g., advertisers) may provide content items (e.g., electronic advertisements) for display with a web page. The content item may include or be associated with a phone number or other identifier (e.g., click-to-call advertisement, or call only advertisement) that allows a user, potential customer or other viewer of the content item to contact or initiate a communication with the content provider.

The data processing system can select and provide a call content item for display with a webpage. The call content item may include an advertisement in the form of a sponsored link included by the search engine (e.g., via content selector) in the search results. The content item may include a link or button to a phone number that facilitates providing tracking data to a content provider. A user selects or clicks on a call button of the call content item, or calls the provided number. This number may be a virtual number or forwarding number provided and selected by the data processing system. The data processing system then receives the call and identifies a phone number associated with the call and the content item. For example, the data processing system may tie or map the virtual number of the content item with a phone number of a device of the content provider. The data processing system may initiate a call to the content provider and then bridge the two legs of the call (e.g., the customer's call to the data processing system with the data processing system's call to the content provider).

The data processing system can select a communication identifier (e.g., type of phone number) for a device of a content provider. The data processing system can receive a request for content for display via a computing device. The data processing system can identify, responsive to the request, a content item provided by the content provider. The data processing system can determine a feature of the computing device. The data processing system can determine a feature of the content item. The data processing system can select a type of phone number for the content provider based on both the feature of the computing device and the feature of the content item. The data processing system can transmit a phone number for the content item corresponding to the type of phone number. The computing device can receive the phone number and display or otherwise present the phone number. The data processing system can receive an indication to establish a communication channel corresponding to the phone number that the data processing system transmitted to the computing device. The data processing system can identify, via a multiplexer, a phone number of a device of a content provider using the phone number of the content item or information about the computing device, such as caller identifier information of the computing device. In some cases the phone number for the device of the content provider is different from the phone number provided with the content item. The data processing system can establish the communication channel between the computing device and the device of the content provider. For example, the data processing system can call the device of the content provider and then bridge the call with the call received from the computing device.

FIG. 1 illustrates an example system 100 for selecting a communication identifier for a device of a content provider via a computer network. The system 100 can include content selection infrastructure. The system 100 can include a data processing system 120 communicating with one or more of a content provider computing device 125, content publisher computing device 115 or computing device 110 (e.g., caller computing device 110) via a network 105. The computing device 110 can refer to a caller computing device. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be displayed on at least one computing device 110, such as a laptop, desktop, tablet, personal digital assistant, smart phone, or portable computers. For example, via the network 105 a user of the computing device 110 can access web pages provided by at least one web site operator or content publisher 115. In this example, a web browser of the computing device 110 can access a web server of the web site operator or content publisher 115 to retrieve a web page for display on a monitor or display device of the computing device 110. The web site operator or content publisher 115 generally includes an entity that operates the web page. In one implementation, the web site operator or content publisher 115 includes at least one web page server that communicates with the network 105 to make the web page available to the computing device 110.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 120. The data processing system 120 can include at least one logic device such as a computing device having a processor to communicate via the network 105, for example with the computing device 110, the web site operator or content publisher computing device 115, and at least one content provider computing device 125. The data processing system 120 can include at least one server. For example, the data processing system 120 can include a plurality of servers located in at least one data center. The data processing system 120 can include multiple, logically-grouped servers and facilitate distributed computing techniques. The logical group of servers may be referred to as a server farm or a machine farm. The servers can also be geographically dispersed. A machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralizing the servers and storage systems and coupling them with advanced system management tools allows more efficient use of server resources.

The data processing system 120 can include a content placement system having at least one server. The data processing system 120 can also include at least one content selector 135, at least one number allocator 140, at least one multiplexer 145, at least one bridging module 150, and at least one data repository 155. The content selector 135, number allocator 140, multiplexer 145 and bridging module 150 can each include at least one processing unit or other logic device such as programmable logic array engine, or module configured to communicate with the database repository or database 155. The content selector 135, number allocator 140, multiplexer 145, bridging module 150 and data repository 150 can be separate components, a single component, or part of the data processing system 120. The system 100 and its components, such as a data processing system, may include hardware elements, such as one or more processors, logic devices, or circuits.

The data processing system 120 can obtain anonymous computer network activity information associated with a plurality of computing devices 110. A user of a computing device 110 can affirmatively authorize the data processing system 120 to obtain network activity information corresponding to the user's computing device 110. For example, the data processing system 120 can prompt the user of the computing device 110 for consent to obtain one or more types of network activity information, such as geographic location information. The identity of the user of the computing device 110 can remain anonymous and the computing device 110 may be associated with a unique identifier (e.g., a unique identifier for the user or the computing device provided by the data processing system or a user of the computing device). The data processing system can associate each observation with a corresponding unique identifier.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be treated in one or more ways before it is stored or used, so that certain information about the user is removed when generating parameters (e.g., demographic parameters). For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server.

The data processing system 120 can receive a request for content. The request may include a query such as a search query input into a search engine of the data processing system. The input query may include text, characters, or symbols. The data processing system 120 may receive the input query from a computing device 110 via network 105. The input query may include audio (e.g., words spoken by a user of the computing device 110 and input into the search engine of the data processing system via network 105 and an interface). The request may include or be associated with information that facilitates selecting content responsive to the request. The information may include, e.g., contextual information about an electronic document, web page, electronic application, or organic, non-advertisement link on which the selected content is to be displayed. The data processing system 120 may provide an interface displaying input text boxes, buttons, drop downs, or otherwise widgets through which a user of a client can select or otherwise indicate a category for the search.

Responsive to the search query or other request for content (e.g., electronic advertisements), the data processing system 120 (e.g., via content selector 135) can identify, select or otherwise obtain content to be provided or presented via the computing device 110 making the request, or some other computing device 110 associated with the request for content. In some implementations, the data processing system 120 may identify, select, or otherwise obtain content not responsive to receiving any request. The content may include, e.g., text, characters, symbols, images, video, audio, or multimedia content. The content may include a phone number, a virtual phone number, or a call extension. The content item may include an advertisement in the form of a sponsored link (e.g., provided by content providers) included by the search engine (e.g., via content selector) for display in the search engine results page. The content item may include a link or button to a phone number that facilitates providing tracking data to a content provider. In cases where the content item includes a phone number, virtual phone number or a call extension, the content item may be referred to as a call content item. The request for content can include a request for an online advertisement, article, promotion, coupon, or product description. The data processing system 120 can receive the request from a computing device such as, e.g., computing device 110. For example, the data processing system 120 can receive the request via an application executing on the computing device 110, such as a mobile application executing on a mobile device (e.g., smart phone or tablet). In some cases, the data processing system 120 may not receive a separate request for content and, instead, select and provide the content (e.g., advertisement) responsive to the search query or with search results. In some instances, a web page may request content from the data processing system 120 responsive to a user of a mobile device 110 visiting the web page (e.g., via a mobile device 110).

A content provider 125 of a content item can set up a content campaign data structure 165 in data repository 155. The content campaign data structure stored in data repository 155 and maintained by data processing system 120 can include content items arranged or organized in one or more content groups or one or more content campaigns. The content campaign data structure can include a hierarchical or relational data structure or file structure. For example, the hierarchy can include a content item within a content group; a content group within a content campaign; and the content campaign within a content account of a content provider 125. The one or more content campaigns can be associated with an account identifier of a content provider 125. When setting up the content campaign, content group, or content item, the content provider 125 can establish the content item as a call content item that includes a phone number or call button. In some cases, the content provider 125 can associate the content item (or content group or content campaign) with content selection criteria (e.g., keywords, terms, phrases, bid amount). The content provider 125 can further associate the content item with one or more communication identifiers or phone numbers. In some cases, the content provider 125 may associate the content item with a unique or actual phone number for a device of the content provider. This may be the phone number of the content provider or a device of the content provider. In some cases, the content item can be configured with a parameter that indicates or instructs the data processing system 120 to dynamically select a communication identifier for display with the content item. For example, when configuring the content item (or content group or content campaign), the data processing system 120 may receive, from the content provider 125, an indication to dynamically select a type of phone number for the content item. In this case, the data processing system 120 may not provide the unique or actual phone number of the device of the content provider 125 for display with the content item; instead, the data processing system 120 may display or provide the dynamically select virtual number for display with the content item and then bridge the call made to the dynamically selected virtual number to the actual number of the content provider's device.

The request for content can include information that facilitates content selection. For example, the data processing system 120 may request information from the computing device 110 to facilitate identifying content or content selection. The data processing system 120 may request or obtain information responsive to receiving a request for content from the computing device 110. The information may include information about displaying the content on the computing device 110 (e.g., a content slot size or position) or available resources of computing device 110 to display or otherwise manipulate the content.

The data processing system 120 may identify multiple content items (e.g., a first candidate content item and a second candidate content item) that are responsive to the request for content, or are otherwise candidates for display on an online document (e.g., a web page or a page of an online marketplace). The data processing system may initiate or utilize an online auction process to select one or more of the multiple content items for display on the online document. An auction system may determine two or more bids for content items to be displayed in an online document. The auction system can run the bids through an auction process to determine one or more winning bids or highest ranking bids. Content items corresponding to the winning bid or highest ranking bid may be selected for display on or with the online document.

The data processing system 120 can include a content selector 135. The content selector 135 can analyze, parse, or otherwise process subject matter of candidate content items to determine whether the subject matter of the candidate content items correspond to the online document, search query, or computing device. The content selector 135 can identify, analyze, or recognize terms, characters, text, symbols, or images of the candidate content items using an image processing technique, character recognition technique, or database lookup. The candidate content items may include metadata indicative of the subject matter of the candidate content items, in which case the content selector 135 may process the metadata to determine whether the subject matter of the candidate content item corresponds to the online document.

Content providers may provide additional indicators when setting up a content campaign that includes content items. The content provider may provide information at the content campaign or content group level that the content selector 135 may identify by performing a lookup using information about the candidate content item. For example, the candidate content item may include a unique identifier, which may map to a content group, content campaign, or content provider.

The data processing system 120 can include a number allocator 140. The number allocator 140 can be designed and constructed to determine, identify, or select a type of phone number to provide with a content item selected by the content selector 135. The number allocator 140 can identify, determine or select a phone number corresponding to the type of phone number. The number allocator 140 can provide the phone number for display with the content item, or otherwise provide the phone number to the computing device 110 for use by the computing device. For example, the data processing system 120 can provide the phone number to a call agent of the computing device 110, and cause or instruct the call engine to initiate a communication channel or phone call using the phone number. In some cases, the phone number can be displayed as a selectable link along with the content item displayed on the web page or mobile application executing on the computing device. For example, selecting the link provided by the number allocator 140 via the computing device 110 can initiate a phone call to the data processing system 120.

The data processing system 120 can provide the phone number for display with the content item on the webpage responsive to receiving an indication of interest in the content item. For example, the data processing system 120 can display the content item on the webpage with a button, drop down menu, icon, roll-over icon, or other user interface widget. When a user interacts with the user interface widget (e.g., clicking or selecting a button), the data processing system can receive an indication of the user selection.

The data processing system 120 can determine, responsive to a request for content, the type of phone number to provide with the content item and a corresponding phone number. The data processing system 120 can determine, responsive to receiving the indication of user selection of the content item or button thereof, the type of phone number and corresponding phone number for the content item.

To determine, identify, or select the type of phone number for the content item that is displayed or to be displayed or provided via the computing device, the data processing system 120 can use one or more features of the computing device, one or more features of the content item, or one or more features of both the computing device and the content item. The data processing system 120 can use the one or more features to determine the type of phone number. Features of the computing device can include, e.g., a type of computing device (e.g., mobile device, smartphone, smartwatch, wearable device, laptop, notebook, desktop, all-in-one, tablet), type of operating system executed by the device, location of the device (e.g., state, city, town, county, latitude coordinates, longitude coordinates, address), motion of the device (e.g., walking, stationary, driving), network activity associated with the computing device (e.g., search query input into a search engine via the computing device, a web page accessed by the computing device), network connection of the computing device (e.g., cellular network, WIFI), profile information (e.g., preferences related to call content item such as type of phone number user prefers). For example, the data processing system 120 can use information associated with a browsing session or historical browsing activity of the computing device.

The data processing system 120 can determine, receive or otherwise identify a feature of the computing device 110 using information detected or determined via a sensor 160 configured on the computing device 110. The sensor 160 can include, e.g., a location sensor such as a Global Positioning System ("GPS") sensor, accelerometer, motion sensor, gyroscope, ambient light sensor, or WIFI sensor.

The data processing system 120 can use one or more features of the content item to select the type of phone number. Features of the content item can include, e.g., content selection criteria of the content item (e.g., a keyword associated with the content item that is used by the data processing system 120 to select the content item responsive to a request for content), location information associated with the content item (e.g., a location associated with the content item that can be used to facilitate content selection), a type of content item (e.g., text advertisement, video advertisement, audio advertisement, multimedia advertisement), a topic of the content item (e.g., an advertisement for a product, an advertisement for goods, an advertisement for a service, an advertisement for a subscription, or an advertisement to conduct a survey). The features of the content item can be stored in the content campaign data structure 170 and linked with the content item.

The data processing system 120 can use one or more features of the web page to select the type of phone number. Features of the web page can include or indicate, e.g., a topic of the web page (e.g., entertainment, news, travel, sports, or hobby), a product or service of the web page, online marketplace, or online retailer.

The number allocator 140 can be configured one or more techniques or selection logic that can be applied to the features of the computing device, content item, or web page to facilitate selecting a type of phone number. In some cases, the number allocator 140 can retrieve a phone number selection process configured by a content provider and stored in the content campaign data structure 170. In some cases, the number allocator 140 can be preconfigured with phone number selection logic and techniques.

The type of phone number can be configured based on selection logic or parameters, such as geographic location of a computing device, keywords that match search queries, entity type, calling charges, type of call (e.g., sales call or service call), or available phone numbers. For example, the number allocator 140 can select the type of phone number based on the type of phone number provided by the content provider 125. For example, the content provider 125 can configure the content item in the content campaign data structure 170 with multiple phone numbers, where each phone number corresponds to a type of phone number. A first phone number may be a local phone number, a second phone number may be a toll free number, and a third phone number may be a premium phone number. The number allocator 140 may identify a weight, priority, or ranking associated with the types of phone numbers. For example, the number allocator 140 can determine, based on a feature associated with the computing device and content item, to select the phone number. The data processing system 120 can make this determination using a rule. For example, the data processing system 120 can prioritize local phone numbers for display with content items accessed via desktop or laptop computers. The data processing system 120 can prioritize local phone numbers for content items associated with a brick and mortar retail store, such as a flower shop, dry cleaner, local coffee shop or restaurant.

The data processing system 120 can further determine the local phone number based on a feature of the computing device such as a geographic location of the computing device. For example, the data processing system 120 can determine the local phone number such that the local phone number corresponds to or includes a local area code of the geographic location of the computing device. The data processing system 120 can access a data structure storing a directory of area codes mapped to geographic location;

perform a lookup using the geographic location (e.g., by mapping a latitude and longitude of the computing device to a city, town, state or county, and then using the town to perform a lookup in the area code directory to retrieve or identify the area code). The data processing system 120 can dynamically generate a phone number (e.g., a virtual phone number) that includes the identified local area code. The data processing system 120 can then assign this virtual phone number to the content item, and provide the phone number for display with the content item on the computing device, or otherwise provide the virtual, dynamically selected, local phone number to the computing device. Thus, in some cases, the data processing system 120 can prioritize the local phone number higher than the toll free number.

The data processing system 120 can determine the type of phone number (e.g., local number, local number to the computing device, or toll free number) based on the geographic location of the computing device. The data processing system 120 can receive location information detected by a sensor 160 of the computing device or otherwise determined (e.g., profile information associated with the computing device, Internet Protocol address, cell phone tower triangulation, or beacon). Based on the geographic location of the computing device 110, the data processing system 120 can identify phone numbers that are available to be assigned to the content item. For example, in some implementations, the content provider 125 can select a set of phone numbers, and the data processing system 120 may choose the phone number to provide with the content item from the set. In some implementations, the data processing system 120 can dynamically generate a phone number based on one or more features.

In the situation in which the content provider 125 provides the set of phone numbers, the data processing system 120 can determine the location of the computing device, and then perform a lookup in the content campaign data structure 170 to determine whether there is a phone number with a matching local area code associated with the selected content item. If the data processing system 120 identifies a match, the data processing system 120 can select the matching number to provide to the content item. If the data processing system 120 does not identify a match, the data processing system 120 may select another local number, such as a local number that is geographically closest to the computing device 110 (e.g., same state, geographic region, or country). For example, the data processing system 120 can map each phone number in the set of phone numbers to a geographic location, determine a distance between the mapped geographic location and the computing device, and select the phone number corresponding to the shortest distance.

In some cases, the data processing system 120 can select the type of phone number based on whether the call may correspond to a service request or a sales request. The data processing system 120 can select a shared cost or premium phone number for service requests, and local or toll free numbers for sales requests. A service request can be a user request for information or advice, or for a standard change (a pre-approved change that is low risk, relatively common and follows a procedure) or for access to an IT service. For example, a service request can be for technical support such as recover or change a password, billing inquiry, or change a phone service plan. A sales request can be a request to purchase a new product or service, such as purchase a computer, hire a service provider (e.g., painter, plumber, landscaping, auto repair, or to install cable or satellite television).

The data processing system 120 can determine whether a call is associated with a service request or sales request based on network activity associated with the computing device. The network activity can include a search query input into a search engine via the computing device. The data processing system 120 can determine context or intent from the search query. For example, the data processing system 120 can determine, based on the search query, a likelihood of interest in a service. A service may include, e.g., a request for service or support on a product that has already been purchased, such as technical support for a computing device, billing inquiry on a phone plan or cable plan, or maintenance request. The data processing system 120 can determine this interest based on terms or keywords in the search request such as "help with phone bill", or "computer support for crashing". The data processing system 120 can further determine whether a call is a service call based on the selected content item. For example, the selected content item may include keywords or phrases that indicate that the content item is an advertisement for a service request. The content provider 125 can tag the content item as a service-related content item. Thus, the data processing system 120 can determine based on a feature of the computing device (e.g., browsing activity or search request entered via the computing device) and a feature of the content item (e.g., keyword or tagged information), that the call corresponds to a service call. If the data processing system 120 determines that the call to be made is a service request, the data processing system 120 can select a shared cost or premium phone number. Premium-rate telephone numbers are telephone numbers for telephone calls during which certain services are provided, and for which prices higher than normal can be charged. Part of the call charge is paid to the telephone service provider, thus enabling content providers to be funded via the calls. While the billing is different, calls are usually routed the same way they are for a toll-free telephone number, being anywhere despite the area code used. These telephone numbers can be allocated from a national telephone numbering plan in such a way that they are easily distinguished from other numbers (e.g., "900" number).

In some cases, the data processing system 120 can determine that the content item and corresponding call to be made is for a sales request. A sales request can refer to a new request to purchase a product or service. The data processing system 120 can determine that the call may correspond to a sales request based on keywords of a search query or content item. For example, the search query may include terms "new computer"; "plumbers near San Francisco"; or "interior painters near San Jose". In some cases, the content provider 125 can tag a content item as a sales content item. The data processing system 120, upon determining based on one or more features that the content item corresponds to a sales request, can select a local number or a toll free number.

In some cases, the data processing system 120 can determine call charges in a given region and then determine whether to use a local number, toll free number or shared cost number. The data processing system 120 can select the local number, toll free number or shared cost phone number based on a bid amount for the content item set by the content provider. For example, telephone service providers or cell phone service providers may charge for a phone call based on the endpoints of the phone call and duration of the phone call. For example, a call made between a computing device in a first country and a computing device in a second country may incur greater fees as compared to a phone call between two devices in the same town. Furthermore, different phone service providers may charge different amounts for phone calls. The data processing system 120 can obtain or access a database storing calling rates charged by phone service providers. The service providers can be associated with a geographic region or area. Thus, the data processing system 120 can determine rates for calls based on a geographic region. For example, the data processing system 120 can determine that the computing device 110 is in a first geographic region, and then determine a calling rate for the geographic region. The data processing system 120 may determine that the calling rate for that region for long distance calls is high. Thus, to increase a likelihood that a user may call a phone number provided with the content item, the data processing system 120 can select a toll free number or local number for the content item.

In some cases, the data processing system 120 may select the type of phone number based on a bid amount of the content item. For example, if the bid amount of the content item was high, the data processing system 120 may select a type of phone number that increases the likelihood of a click or selection of the content item. In some cases, the data processing system 120 may subsidize or pay for the call in order to increase the likelihood of conversion. For example, the data processing system 120 can select a toll free number, thereby reducing or eliminating fees incurred by the caller.

In some cases, the data processing system 120 can select a type of phone number based on one or more features of the computing device and content item. The data processing system 120 can use a machine learning model trained based on historical performance. The data processing system 120 can train the machine learning model using features and historical performance. The historical performance can be stored in data repository 155 in a historical performance data structure 175. The machine learning model can be stored in data repository 155 or data structure 175. For example, the data processing system 120 can maintain a content item impression record. In the content item impression record, the data processing system 120 can store information about the content item (e.g., keywords, topic, type of content item, web page on which the content item is displayed), information used to select the content item, features associated with the computing device, and whether the content item was selected or not. The data processing system 120 can further maintain, in the content item impression record, information about whether or not a call was made. For example, if a unique virtual number configured for call tracking was generated or allocated for this content item, the phone number may be a phone number of the data processing system 120, in which case the data processing system 120 can associate the phone number with the call content item and impression.

The data processing system 120 can use this information associated with a content impression to train a machine learning model. In some implementations, the data processing system 120 or number allocator 140 can be configured with a machine learning engine or technique. The data processing system 120 can generate, maintain, or update the model. The data processing system 120 can use or be configured with one or more machine learning techniques to generate the model. The machine learning technique can include one or more statistical technique, for example, a supervised machine learning technique, neural network, regression technique, linear regression technique, or Bayesian estimator. To generate the model, the data processing system 120 can obtain feature data and signal data associated with several content item impressions, and train the model using the feature data and corresponding signal data of each of the historical content item impressions. For example, the data processing system 120 can be configured with a regression analysis technique that uses a statistical process to estimate the relationship between a feature or combination of features and a signal. The feature or combination of features can be a predictor or independent variable, and the signal can be a dependent variable or a criterion variable that can change as the features are varied. In some cases, the data processing system 120 can estimate or determine a conditional expectation of the dependent variable given the independent variables (e.g., an average value of the dependent variable when the independent variables are fixed; or other parameter or metric of the conditional distribution of the dependent variable or signal given the independent variable or feature). The predicted signal can be a function of the independent variables and can be referred to as a regression function. The data processing system 120 can further identify, determine or characterize a variation of the dependent variable around the regression function which can be described by a probability distribution. The data processing system 120 can use the probability distribution to generate a confidence score in the predicted signal value, or use the probability distribution as the confidence score.

To generate the model, the data processing system 120 can receive feedback signals associated with content impressions from computing devices. The feedback signals can be received via an electronic feedback interface presented along with content items (e.g., advertisements) displayed on a webpage. The feedback signals may include binary values (e.g., 0, 1, yes, no, like, dislike, relevant, or not relevant). The data processing system can determine, identify, or obtain feedback using techniques such as based on browsing behavior or viewing behavior changing determined based on tracking viewing activity of a webpage, biometric sensors such as eye tracking, or input/ouput tracking.

Using the machine learning model, the data processing system 120 can determine a type of phone number to select for a combination of features associated with the computing device and content item. The data processing system 120 can input the detected or identified features associated with the content impression into the machine learning model, and receive, as an output, a score or weight for one or more types of phone numbers. For example, the features can include: sales request for new roof; mobile device; San Francisco; content item corresponds to content provider located in San Francisco. The data processing system 120 can then input this into the machine learning model to determine that, based on historical performance, providing a local phone number is most likely to result in a click or conversion.

In some cases, the data processing system 120 can use a virtual phone number that results in the computing device calling the data processing system 120, and the data processing system 120 bridging the call with an actual phone number of the content provider device. The data processing system 120 can access a pool or repository of available phone numbers or virtual numbers. The virtual numbers may already be assigned to the content provider associated with the content item. The virtual numbers may be assigned to a content campaign or a content group that includes the content item. The virtual number may be a toll free "800" number, a charge number such as a "900" number, a local number, or a long distance number.

The data processing system can determine the virtual number to be an available virtual number if the virtual number is not currently assigned to another content item or content provider. For example, due to the limited number of virtual numbers and the costs associated with purchasing phone numbers, the number allocator 140 may be configured with one or more policies that facilitate reusing or recycling virtual numbers. The number allocator 140 may reuse a virtual number if the number has not been provided for display for a time interval or duration (e.g., 2 hours, 24 hours, 72 hours, a week, 30 days, 60 days, or 90 days).

The data processing system 120 can include a multiplexer 145 designed and constructed to map the selected phone number to a phone number of a device of the content provider. The phone number for the device of the content provider can be different from the phone number identified by the data processing system 120. For example, the data processing system 120 can map static identifiers (e.g., a phone number of a device of the content provider) to dynamic identifiers (e.g., the virtual phone number selected by the data processing system 120 based on features) such that there is a unique tuple, or ordered list. By using a unique tuple, the data processing system 120 can assign a single dynamic identifier to multiple client or provider devices. In some cases, a single client device or provider device may have multiple dynamic identifiers. In some implementations, the same dynamic identifier can be used to identify multiple client devices or provider devices.

The data processing system 120 (e.g., via multiplexer 145) can establish, assign, or identify a tuple for a communication channel. The data processing system 120 can store this mapping in a multiplexing data structure 165 stored in data repository 155. For example, a communication channel can be defined or identified by the tuple. The tuple may include, e.g., (client static identifier, client dynamic identifier, provider dynamic identifier, provider static identifier). The tuple may be an n-tuple, where "n" may be 2, 3, or 4. The following table illustrates static and dynamic identifiers assigned to client and provider devices, and can be stored in multiplexing data structure 165.

TABLE 1

Static and Dynamic Identifiers for Communication Channels

| Asynchronous Communication Channel # | Client Static Identifier | Client Dynamic Identifier | Provider Dynamic Identifier | Provider Static Identifier |
|---|---|---|---|---|
| 1 | A1 | B1 | C1 | D1 |
| 2 | A1 | B2 | C2 | D2 |
| 3 | A2 | B1 | C2 | D2 |
| 4 | A2 | B2 | C1 | D1 |

Table 1 illustrates static and dynamic identifiers for communication channels. As illustrated in the table, a first client device can have a static identifier of A1 and a second client device can have a static identifier of A2. The first client device can have a dynamic identifier of B1 and B2, while the second client device may also have dynamic identifiers B1 and B2. Thus, the data processing system 120 can reuse the dynamic identifier. However, to establish the communication channel, the data processing system 120 can identify a unique tuple of the communication channel to identify a corresponding provider identifier. For example, the first communication channel is between client static identifier A1 and provider static identifier D1. The data processing system 120 can receive a request to initiate the first communication channel. The request can include the client static identifier A1 identifying a client device. The request can further identify a provider dynamic identifier C1. The data processing system 120 can generate a tuple that includes the client static identifier A1 and provider dynamic identifier C1 as follows (A1, C1) or (C1, A1). The tuple (A1, C1) may map to provider static identifier D1 identifying a provider device. In another example, the request can identify the client static identifier A1 and client dynamic identifier B1 and provider dynamic identifier D1. Thus, the data processing system 120 can map the tuple (A1, B1, D1) to the provider static identifier C1.

When the content provider receives the call over the first communication channel 1, the provider may receive one or more of the client dynamic identifier B1 corresponding to the channel, the provider dynamic identifier B1 and the provider static identifier D1. The provider may then respond to the message or, at some later time, choose to send or transmit a message to a client device destined to client dynamic identifier B1. Since the static identifiers are hidden from the opposing endpoints of the communication channel or communication connection, the data processing system 120 can perform the tuple mapping technique to identify the corresponding client static identifier that is mapped to the client dynamic identifier B1. For example, the provider may send a request to send a message. The request can indicate the source address such as provider static identifier D1 and the provider dynamic identifier C1. The request may further indicate a destination address such as the client dynamic identifier B1. Thus, the data processing system 120 can generate a tuple (D1, C1, B1) and determine that this tuple maps to client static identifier A1. In another example, the data processing system 120 may generate tuple (D1, B1) and determine that this tuple maps to static identifier A1.

Using a tuple mapping technique may facilitate the data processing system 120 reusing dynamic identifiers. For example, client static identifier A2 can also have dynamic identifier B1. For example, a third communication channel 3 can include client static identifier A2, dynamic identifier B1, provider dynamic identifier C2 and provider static identifier D2. While the dynamic identifier B1 is being reused, the tuple is still unique because (A2, B1) can map to a unique static identifier D2. Thus, a request to initiate the third communication channel can include the static identifier 2 and provider dynamic identifier C2. The data processing system 120 can generate, from the identifiers in the request, the tuple (A2, C2) and map this tuple to static identifier D2. Similarly, when the provider device responds or messages the client device, the data processing system 120 can receive the provider static identifier D2 identifying the provider device and the dynamic identifier B1. The data processing system 120 can generate tuple (D2, B1) which can map to static identifier A2 identifying the client device of the second provider. In another example, the request can include the provider static identifier D2 and provider dynamic identifier C2 and client dynamic identifier B1. The data processing system 120 can generate tuple (D2, C2, B1) and determine this tuple maps to static identifier A2 identifying the second client device. Thus, the data processing system 120 can maintain a double blind asynchronous communication channel that reuses dynamic identifiers.

The data processing system 120 can include a bridging module 150 designed and constructed to bridge two calls. The data processing system 120 can receive a call from computing device 110 made to a dynamically selected virtual phone number. The data processing system 120 can use the multiplexing data structure 165 to identify a phone number corresponding to a device of the content provider associated with the content item, and initiate a call to the content provider. The data processing system 120 can then bridge the first call made by the computing device with the second call to the content provider made by the data processing system 120 in order to establish a communication channel or path between the computing device and the content provider. In some implementations, the bridging module 150 can forward or route the call to the content provider.

The bridging module 150 can include a combination of hardware and software configured to bridge the calls. In some cases, the bridging module 150 can use packet switching to bridge the call. For example, packets of data can travel from the first computing device to the data processing system 120, and from the data processing system 120 to the content provider device. In some cases, the bridging module 150 can provide circuit switching, where a first call is routed to the bridging module 150, and the bridging module routes the call to the content provider. Thus, the bridging module 150 can establish the communication channel corresponding to the phone number of the content item.

Figure 2:
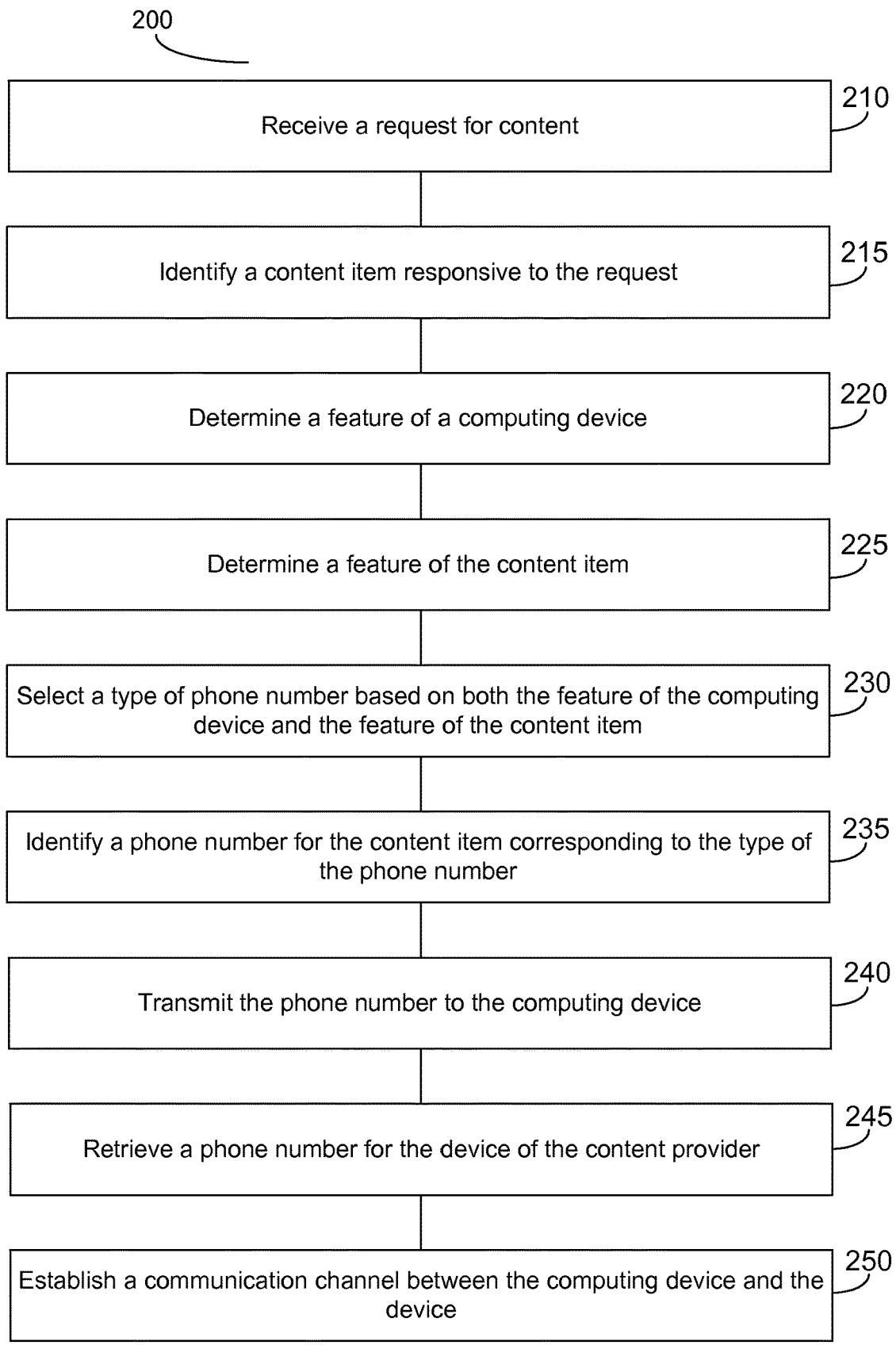
FIG. 2 is an illustration of a method of selecting a communication identifier for a device of a content provider in accordance with an implementation.

FIG. 2 shows an illustration of a method of selecting a communication identifier for a device of a content provider using a computer network in accordance with an implementation. The method 200 can be performed via one or more system of component illustrated in FIG. 1, 3 or 4, including, e.g., a data processing system 120, content selector 135, number allocator 140, multiplexer 145, bridging module 150, or data repository 120. In some implementations, the method 200 includes a data processing system receiving a request for content at 210. At 215, the data processing system identifies a content item responsive to the request. At 220, the data processing system determines a feature of a computing device. At 220, the data processing system determines a feature of the content item. At 230, the data processing system selects a type of phone number based on both the feature of the computing device and the feature of the content item. At 235, the data processing system identifies a phone number for the content item corresponding to the type of the phone number. At 240, the data processing system transmits the phone number to the computing device. At 245, the data processing system identifies a phone number for the device of the content provider. At 250, the data processing system establishes a communication channel between the computing device and the device of the content provider.

In further detail, the method 200 can include a data processing system receiving a request for content at 210. The request for content can be provided by a website publisher and can be for content for display with a webpage. The request for content can be triggered or initiated by a computing device accessing the web page or content of the webpage. The request for content can be triggered responsive to network activity of the computing device. For example, the computing device can enter a search query into a search engine. Responsive to entering the search query into the search engine and initiating the search, the data processing system can receive a request for content or automatically determine or generate a request for content. In some cases, the data processing system may not receive a request for content, but can automatically determine to provide a content item, such as an advertisement.

The request can include information to facilitate selecting content items. The information can include, e.g., information associated with the web page on which the content item is to be provided, a search query entered via the computing device, information or features about the computing device (e.g., type of computing device, location, time of day, motion or mode of transportation).

At 215, the data processing system can identify a content item responsive to the request. The content item can be provided by a content provider prior to receiving the request for content. For example, a content provider can establish a content group or campaign with content selection criteria. The data processing system can select the content item responsive to the content selection criteria established by the content provider matching one or more feature of the content request, and further being the highest ranked content item in a content item auction. In some implementations, the data processing system provides the content item for display with a web page. In some implementations, a content selector executed by a processor of a data processing system provides the content item for display with a webpage. The content selector may select the content item based on content selection criteria. The content item may include content selection criteria provided by the content provider when setting up a content campaign for the content item. The data processing system may access a database storing the content items and corresponding content selection criteria to select the content item. For example, the data processing system may determine that a keyword of the content item matches a search query associated with the web page or other content of the web page, and select the content item based on the matching keyword. The content item may include an advertisement, online document, electronic content item, image, video, multimedia content item. The content item may be or include a call content item that is associated with a phone number.

At 220, the data processing system determines a feature of a computing device. In some cases, the data processing system can determine one or more feature of the computing device prior to receiving the request for content, or after receiving and displaying the content item. The data processing system can determine the feature of the computing device using information received from or detected by the computing device. The data processing system can determine one or more feature based on information stored in a profile database in data repository 155. The profile can be a profile published or provided by an administrator or user of the computing device. Features can include any feature that may facilitate selecting a content item or selecting a type of phone number to provide with a content item. Features can include preferences for types of content items, or types of phone numbers. Features can include location information, device type information, interests, historical browsing activity information, network activity, or mode of transportation. In some cases, the data processing system can detect, identify or determine a feature based on information measured or obtained from a sensor of a computing device, such as a GPS sensor, accelerometer, temperature sensor, or ambient light sensor. For example, a feature of the computing device based on location information can include city, state, county, town, geographic region, country, rural, urban, metro area, climate, weather, beach area, tropical area, or topographical information.

The data processing system can determine a feature of the computing based on at least one of a device type or a search query input into a search engine. The data processing system can determine multiple features based on the device type and the search query input. For example, the data processing system can determine a first feature based on the device type, and a second feature based on the search query. The data processing system can determine the feature of the content based on a keyword of the content item. The data processing system can determine the feature of the web page based on a keyword of the web page. The feature can include the keyword. The feature can include synonyms or semantic meaning about the keyword. The feature can include a content vertical or topic.

At 225, the data processing system determines a feature of the content item. Features of the content item can include keywords, terms, phrases or topics associated with the content item. Features of the content item can further include information associated with a content provider, content account, content campaign or content group corresponding to the content item. For example, a feature of a content item can include a location of a brick and mortar retail store associated with the content item. In some cases, a content provider can tag the content item with information that facilitates selecting a type of phone number for the content item. The information can indicate whether the content item is for a service request or a sales request. In some implementations, the content provider can tag the content item with a preference, priority, weight, or rank for types of phone numbers to select, assign, or allocate to the content item responsive to a request for the content item or a request for a phone number for the content item.

For example, the data processing system can receive, from the content provider, content selection criteria and additional values for parameters that can be used to set up the content group. During (or after) set up of the content group, the content provider can provide a preference for types of phone numbers as follows: (1) local #, (2) toll-free number. Thus, when allocating a phone number for this content item, the data processing system can first attempt to find an available local phone number. If the content provider does not have a local phone number (and the data processing system does not or cannot dynamically generate or identify a local virtual number), the data processing system can then select the toll-free number.

At 230, the data processing system selects a type of phone number based on both the feature of the computing device and the feature of the content item. For example, the data processing system can determine the feature of the computing device based on a location of the computing device detected via a sensor of the computing device. The data processing system can determine the feature of the content item based on a location stored in a content campaign data structure of the content item. For example, the location stored in the content campaign data structure can be a location of a brick and mortar retail store, or location preference of a content provider. The data processing system can determine a distance metric based on the feature of the computing device and the feature of the content item. The distance metric can indicate the distance between the computing device and the location of the content provider. For example, the distance metric can indicate that a computing device is within one mile of a restaurant of the content provider. The distance metric can be a numerical value that is the distance between two locations. Distance metric can indicates a distance based on a driving distance, flying distance, or walking distance. In some cases, the data processing system can determine a travel time metric that indicates the amount of time it would for the computing device to travel to the location of the content provider. The distance metric may include or be based on the travel time metric. In some cases, the distance metric can refer to a scale or distance category, such as: local, intermediate, or long-distance. Thus, the data processing system can use the distance metric to select a type of phone number. For example, if the distance metric is a numerical distance, the data processing system can determine that the computing device is local (e.g., the distance metric of 1 mile being less than a distance threshold of 5 miles, 10 miles, 15 miles or 20 miles).

The data processing system can select a type of content item based on a historical performance model. The data processing system can retrieve a historical performance model generated for a content campaign including the content item. The historical performance model can include content impression records, features or information associated with the content impression (e.g., time of day, location, web page, keywords, search query, topic, type of computing device, profile information, type of phone number allocated to the content item), or feedback signals (e.g., click, conversion, or call to the content provider). The data processing system can input this historical performance information into a machine learning engine to generate a machine learning model. The data processing system can maintain or update the machine learning model as the data processing system receives or identifies additional performance information.

With the historical performance model, the data processing system can determine the type of phone number that can lead to the highest interaction level (e.g., that is most likely to result in a click, conversion or call to the content provider) based on a current combination of features. The data processing system can then select this type of phone number (e.g., local, toll free, shared cost, or premium) for the content item. The data processing system can further identify a phone number to provide with the content item that corresponds to the type of the content item based on the type of phone number corresponding to the highest interaction level. For example, if the selected type is toll-free, the data processing system can then identify an available or allocated toll free number such as "800-555-555" and provide it with the content item or otherwise provide it to the computing device to cause the computing device to initiate a call to the phone number.

The data processing system can be configured to select the type of phone number to optimize a metric. Optimization can refer to minimizing the metric or maximizing the metric. The content provider can provide a preferred optimization metric for a specific content item, content group, or content campaign. Optimization metrics can include cost of call to the caller, cost of call to the content provider, likelihood of user calling the content provider, or cost of call to administrator of data processing system. For example, a content provider may instruct the data processing system to maximize the likelihood of a user calling the content provider for a first content item that corresponds to a sales request for a luxury vacation package. The content provider may instruct the data processing system to minimize a cost of a call to the content provider for a service request for technical support issue such as recovering a password. The content provider may instruct the data processing system can to minimize a cost of a call to the caller of a personal help line.

For example, a feature used to train the machine learning model can include cost of the call. The data processing system can determine a likelihood of interaction with the content item or a call based on the cost of the call. The cost can be determined for the content impression based on an estimate of a type of phone number and calling rates of the region. In some cases, the data processing system can determine the cost of the call as a binary value that indicates whether the call is free or not free (to the caller or the content provider).

If the content provider instructs the data processing system to maximize the likelihood of a call, the data processing system can input the features associated with the content item impression into the machine learning model and automatically select the type of phone number this is most likely to result in a call. The data processing system can input the feature of the computing device and the feature of the content item into a historical performance model generated and maintained by a machine learning engine of the data processing system. The data processing system can identify, responsive to inputting the feature of the computing device and the feature of the content item, a first weight for a first type of phone number and a second weight for a second type of phone number. The data processing system can select, based on a comparison of the first weight and the second weight, the first type of phone number to use to identify the phone number of the content item. For example, the machine learning model can provide a weight or score for each type of phone number based on the features as follows: local–0.8; toll free –0.6; shared –0.2; premium –0.1. Thus, the data processing system can rank the weights or scores to determine that the local phone number corresponds to the highest score, which indicates the highest likelihood of a call based on historic performance data.

In some cases, the content provider can instruct the data processing system to minimize a cost of the call to the content provider. The data processing can then determine to select a premium phone number for the content item. In some cases, the content provider can instruct the data processing system to select a phone number based on a combination of metrics. For example, the data processing system can be configured to select a type of phone number for the content item that minimizes the cost of the call to the content provider, but while keeping the likelihood of interaction or call above a threshold (e.g., above 0.3). Thus, the data processing system can determine a likelihood of a call for each type of phone number, and select the type of phone number that minimizes the cost but also corresponds to a likelihood of call above the threshold. In the example above, the local number would minimize the cost of the call while also provide a likelihood of a call above the threshold, whereas the shared or premium phone number types would result in a likelihood of call below the threshold provided by the content provider (or predetermined by the data processing system or dynamically determined by the data processing system).

In some cases, the data processing system can determine, from a content item data structure established with input received from the content provider, a value for a parameter indicating to minimize costs incurred by the computing device for the communication channel. The data processing system can then identify the available types of phone number for this content item. For example, the data processing system can access a data structure (e.g., a content campaign data structure) stored in memory that maps the toll-free phone number, a premium phone number, a shared cost phone number and a local number to the phone number of the device of the content provider. The local phone number can correspond to a local phone number of the content provider device, and may not refer to a number that is also local to the caller computing device. For example, from the perspective of the computing device, this number may be a long-distance number or other non-local number (e.g., in a different area code from a location of the caller computing device). The data processing system can determine, responsive to the value indicating to minimize costs, that a toll-free number type would minimize the costs incurred by the caller computing device. For example, the data processing system can determine that the shared and premium phone numbers would cause the caller computing device to incur a cost.

The data processing system can further determine that the available local phone number mapped to the content provider device in the data structure is not a phone number that is also local to the caller computing device (e.g., based on location information identified for the caller computing device or an area code associated with the caller computing device).

For example, the data processing system can identify a feature of the computing device using a profile data structure stored in a data repository of the data processing system. The feature can correspond to a value stored in the profile that indicates a preference for a type of phone number. The data processing system can determine that a feature of the content item corresponds to the feature of the computing device. For example, the content provider may indicate a same preference for the type of phone number. Responsive to the feature of the computing device corresponding to the feature of the content item (e.g., matching), the data processing system can select the phone number for the content item.

At 235, the data processing system identifies a phone number for the content item corresponding to the type of the phone number. In some cases, the data processing system identifies a phone number provided by the content provider that maps to a type of phone number selected by the data processing system. For example, the content provider can associate the content item with a toll-free number of the content provider and a local number of the content provider. In some cases, the data processing system selects a type of phone number based on the combination of features, and then identifies an available phone number for the content provider corresponding to the type. If the content item includes the phone number corresponding to the type, then the data processing system can select the included phone number to provide to the computing device.

In some cases, the data processing system can dynamically allocate or assign a virtual phone number to the content item. For example, the data processing system can maintain a pool of virtual phone numbers corresponding to one or more types of phone numbers. In some cases, the data processing system can maintain a pool of phone numbers corresponding to local phone numbers. In some cases, the data processing system may maintain a limited set of virtual local phone numbers. The limited set of virtual local phone number may include some, but not all, local area codes in a geographic region. Thus, in some cases, if the data processing system determines to select a type of phone number corresponding to a local phone number, the data processing system may perform a further check to determine if such a local phone number is available. For cases in which the data processing system determines that such a local phone number is not available, the data processing system may revert to a backup option. The backup option may be a next closest local phone number or a local phone number of the content provider. In some cases, the backup phone number may be a toll-free phone number.

The data processing system may similarly determine a score or weight for the backup phone number options based on historical performance. For example, the data processing system can determine a likelihood of interaction or a call when the provided phone number was a local phone number, but not local to the computing device. The data processing system can compare this score with a toll-free phone number. Based on the comparison, the data processing system can determine that the likelihood of interaction with a content item or content provider resulting from providing a local phone number, even though that local phone number is not local to the computing device location, corresponds to a higher likelihood of interaction or call as compared to the toll-free phone number. Responsive to this determination, the data processing system can select the local phone number.

For example, the content provider may be an entity that specializes in artisanal pasta. The data processing system can determining that potential customers were less likely to call the content provider if the phone number was a toll-free number. This may be because a toll-free number conveys a larger establishment, which may not be what potential customers of a specialty artisanal pasta provider are looking for. Thus, the data processing system can select a local phone number of the artisanal pasta provider, even though the phone number may not be a local number to the computing device, because the data processing system may determine that this will result in a higher likelihood of interaction with the content provider (e.g., phone call to the content provider, conversion, or click on content item). In some cases, the data processing system can select a virtual local phone number for the content provider. The data processing system can receive a call to the virtual local phone number and then bridge the call to a static phone number of a device of the content provider. By configuring the content item with a virtual phone number, the data processing system can track or identify that a call was made responsive to the content item and store the performance information in the historical performance data structure.

In some cases, the data processing system may have access to a limited set of local virtual phone numbers. As these local virtual phone numbers are assigned or allocated to other content providers or content item impressions, the pool of available local virtual numbers may shrink prior to the virtual number becoming available again. Thus, the data processing system can determine that if there is no available local virtual number for a content item, then the backup option is a toll-free number. The data processing system can identify a toll-free number associated with the content provider, or generate an available virtual toll-free phone number for the content item.

At 240, the data processing system transmits the phone number to the computing device. The data processing system can transmit the phone number via a computer network. The data processing system can transmit the phone number to cause the phone number to be displayed via the computing device. The data processing system can transmit the phone number with an instruction to a call engine of the computing device to initiate a call or communication channel. The data processing system can, thus, cause a call engine of the computing device to dial, call, or initiate a communication channel corresponding to the phone number.

In some cases, the data processing system can provide the phone number for display in a portion of the content item displayed on the computing device. For example, the content item can be configured with a script that executes a request for the phone number that is sent to the data processing system. The data processing system, responsive to the request for the phone number, can select and transmit the phone number back to the script that made the request. The script can replace, inject, or otherwise display the received phone number in the content item.

At 245, the data processing system can receive a call from the computing device that is made to the phone number provided by the data processing system to the computing device, and then retrieve or identify a phone number for the device of the content provider. In some cases, sine this phone number is a virtual phone number, the data processing system can identify a phone number that corresponds to a device of the content provider that provided the content item. The data processing system can be an intermediary to the computing device and the content provider device.

To identify the phone number of the content provider, the data processing system (e.g., via a multiplexer) can retrieve or identify a phone number for the device of the content provider using a multiplexing data structure. The phone number for the device of the content provider can be different from the phone number for the content item because the data processing system can select a virtual phone number based on a selection process, where the virtual phone number directs a call to the data processing system. In some cases, the data structure can store a one-to-one mapping of a virtual phone number to a device of the content provider. In some cases, the virtual phone number can be assigned to multiple devices, multiple content providers or multiple caller computing devices.

To retrieve, identify, or map the virtual phone number to a phone number of a device of the content provider, the data processing system can access a multiplexing data structure, such as Table 1 above, to identify a tuple corresponding to a number of the caller computing device and the virtual phone number that maps to a device number of the content provider. The data processing system can use this tuple to uniquely identify a static phone number of the content provider device.

In some cases, the phone number provided by the data processing system can be the phone number of the device of the content provider. In this case, the data processing system may not receive the phone call, as the computing device may directly call the device of the content provider.

At 250, the data processing system establishes a communication channel between the computing device and the device of the content provider. For example, a bridging module can establish, between the computing device and the device of the content provider, the communication channel corresponding to the phone number of the content item. The bridging module can receive packets or a phone call from the caller computing device, and relay, route, forward or otherwise direct the packets and the phone call to the device of the computing device.

For example, the data processing system can receive a call from the computing device with a destination comprising the phone number of the content item. This phone number can be the virtual phone number identified by the data processing system that corresponds to the selected type of phone number. The data processing system can establish the first communication channel between the data processing system and the computing device. Establishing the first communication channel can include receiving the call from the caller computing device and answering or engaging the call from the computing device. In some cases, the data processing system can alter a mode of the communication channel. For example, the data processing system can set the mode of the communication to active or hold. In a hold mode, the first communication channel may not transmit or convey communication data, but may be otherwise active. The data processing system may automatically put the first communication channel in a hold mode while the data processing system bridges the call. Responsive to bridging the call, the data processing system can alter the mode of the first communication channel to an active mode where data can be conveyed or transferred via the channel.

The data processing system can perform a lookup in a multiplexing data structure to map the phone number with an identifier of the device of the content provider. The data processing system can then establish a second communication channel between the data processing system and the device using the identifier. Establishing the second communication channel can include the data processing system calling the device of the content provider, and the device of the content provider answering the call or otherwise engaging or activing the second communication channel. The data processing system can then bridge the first communication channel and the second communication channel to form a communication channel between the computing device and the device of the content provider.

Figure 3:
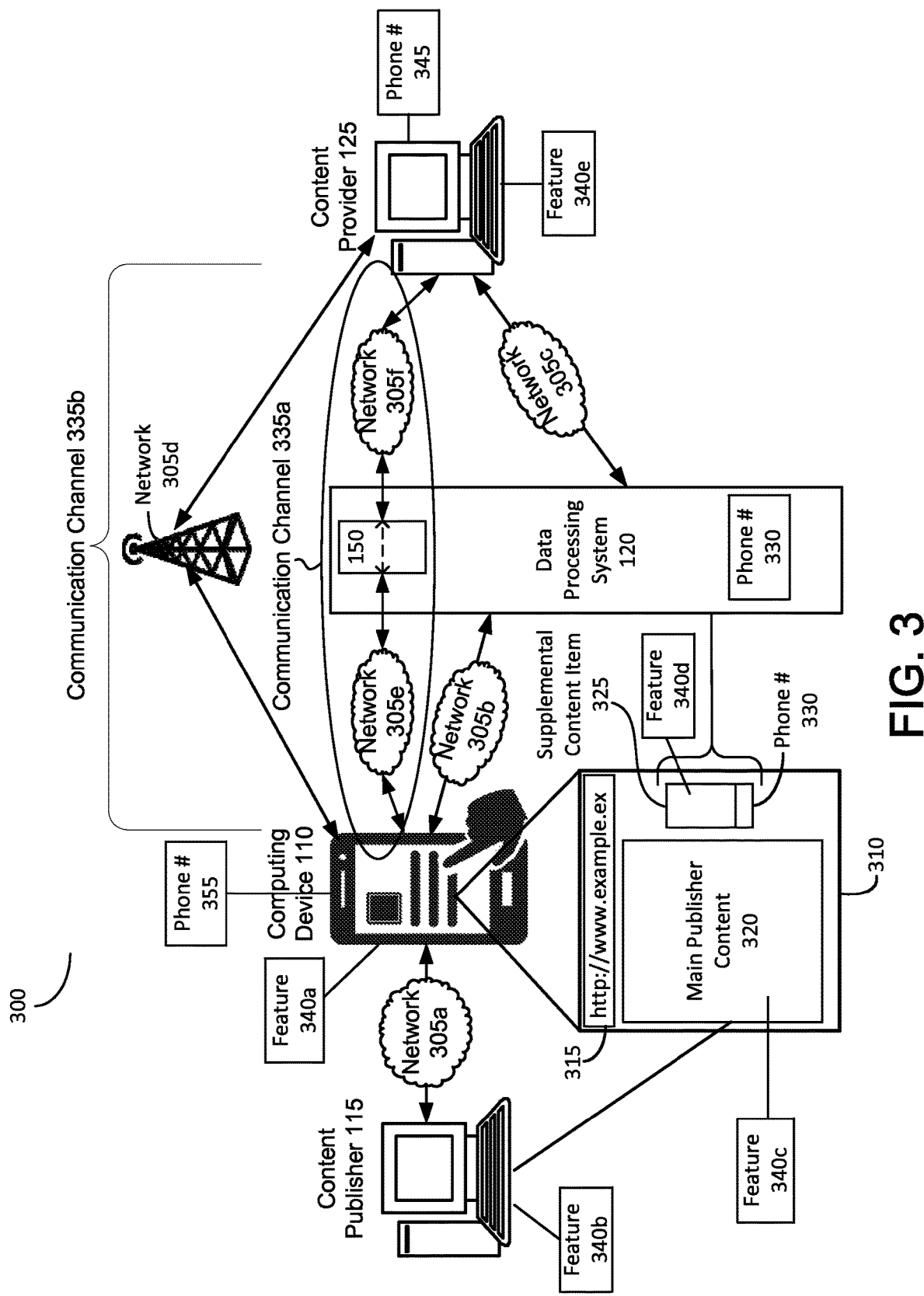
FIG. 3 is a functional block diagram of selecting a communication identifier for a device of a content provider in accordance with an implementation.

FIG. 3 shows a functional block diagram of selecting a communication identifier for a device of a content provider in accordance with an implementation. The computing device 110 can access main publisher content 320 (e.g., an article, blog, video, online document) provided by a content publisher 115. The computing device 110 can access the content publisher via network 305a. The computing device 110 can include or be configured with a phone number 355. Phone number 330 can be different from phone numbers 345 and 355. Network 305a-f can include one or more component or functionality of network 105. The computing device 110 can render the main publisher content 320 via web browser 310. The computing device 110 can display the rendered main content via a display device of the computing device. The computing device 110 can execute the web browser 310 application on one or more processors of the computing device 110. The web browser 310 can include an input text box 315 in which a user of the computing device can input text such as a uniform resource locator or web address for a resource provided via a network (e.g., network 305a).

The web page displayed via web browser 310 can include a supplemental content item 325. The supplemental content item can be provided by a third party content provider 125. The supplemental content item (or referred to as content item) can include an online advertisement. The content item 325 can include a call content item that displays a call button or phone number 330. For example, the content publisher 115 may configure the web page to include a script that generates a request for supplemental content 325. The request can be transmitted from computing device 110 to data processing system 120 via network 305b. Network 305b can include one or more functionality of network 105. In some cases, the content publisher 115 can generate and transmit the request for supplemental content to the data processing system 120 via network 105 or network 305a or network 305b. The data processing system 120 can select a content item 325 and transmit the content item for display via the web browser 315 executed by the computing device 110. The content provider 125 can provide the content item 325 to the data processing system 120 via network 305c during a content account, content campaign, or content group setup procedure. Network 305 can include one or more component or functionality of network 105.

The computing device 110 can include, indicate, or correspond to a feature 340a (e.g., location, device type, search query, sales request, service request, preference for type of phone number, profile information). The content publisher 115 can include, indicate, or correspond to a feature 340b (e.g., vertical, category, industry, size, market). The main publisher content can include, indicate, or correspond to a feature 340c (e.g., keyword, topic, vertical, category). The content item 325 can include, indicate, or correspond to a feature 340d (e.g., keyword, content item type, sales request, service request, topic, vertical, terms, phrase, bid amount, historical performance). The content provider 125 can include, indicate, or correspond to a feature 340e (e.g., vertical, preference for type of phone number, location, type of provider, sales provider, service provider). The content provider 125 can include or be configured with a phone number 345 that corresponds to a device of the content provider.

The data processing system 120 can select a type of phone number based on one or more features 340a-e, and provide a phone number 330 corresponding to the selected type of phone number for display with content item 325. In some cases, the data processing system 120 can cause the computing device to initiate a call to the phone number 330.

In some cases, the data processing system 120 can receive the call made to phone number 330. For example, phone number 330 can include a virtual phone number 330. The data processing system 120 can be configured with virtual phone number 330, which can be the same as virtual phone number 330 of the content item 325. Thus, the data processing system 120 can receive a call made to the virtual phone number 330. Responsive to receiving the call, the data processing system 120 can bridge the call using bridging module 150 with the content provider 125. For example, the data processing system 120 can establish a communication channel 335a that is formed from a first portion of the communication channel between computing device 110 and data processing system 120 via network 305e (which can include one or more component or functionality of network 105). The data processing system 120 can establish a second portion of the communication channel between data processing system 120 and content provider 125 via network 305f. The data processing system 120 (e.g., via bridging module 150) can establish the communication channel 335a by relaying packets, transferring a call, routing a call, forwarding a call, or otherwise establishing a communication path between computing device 110 and content provider device 125.

In some cases, the phone number 330 selected by the data processing system 120 for the content item can be a static phone number for a device of the content provider 125. In this case, the computing device 110 can directly call the content provider 125 to establish communication channel 335b via network 305d. Network 305d can include one or more component or functionality of network 105. The communication channel 335b may not use data processing system 120 as an intermediary.

Figure 4:
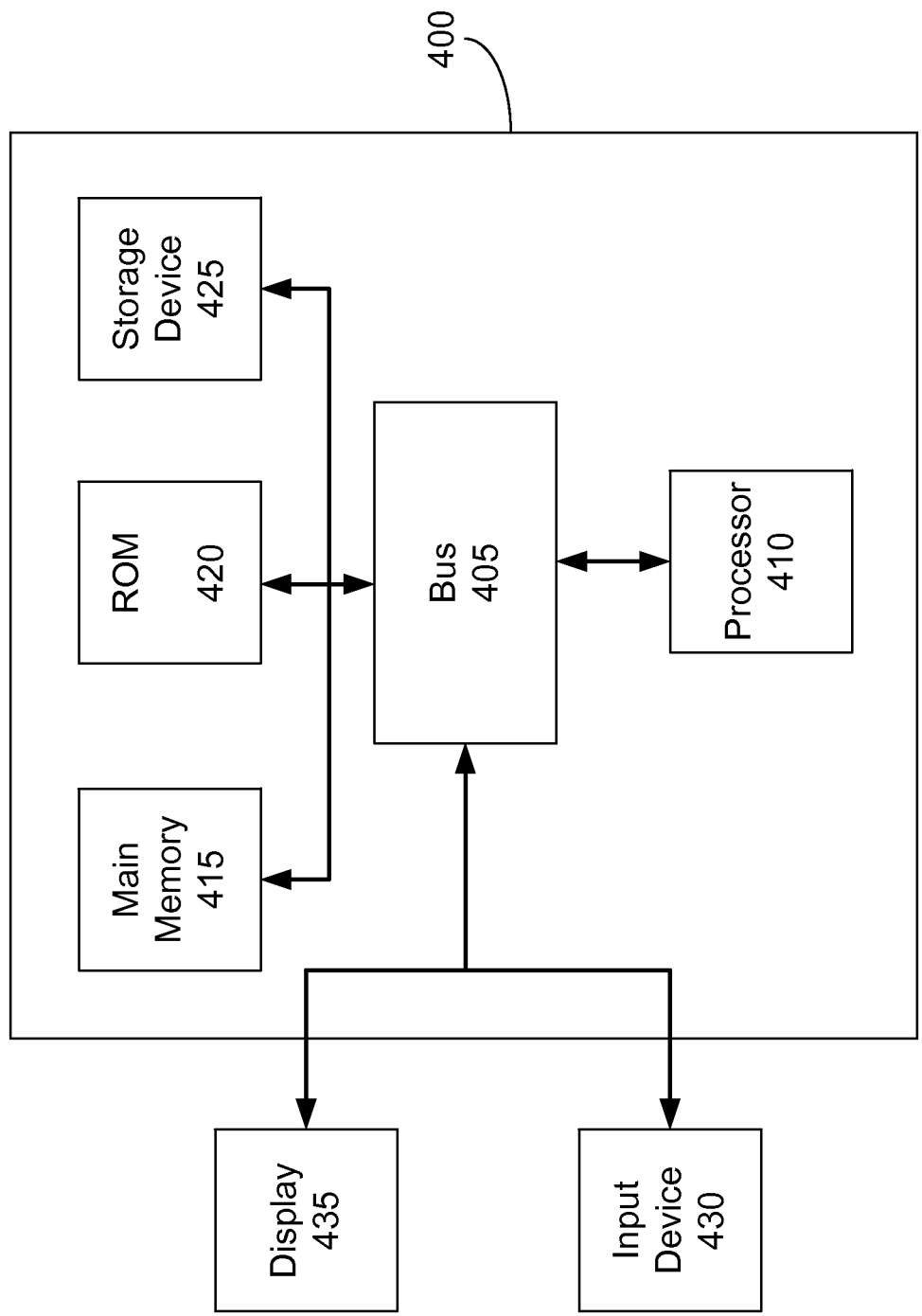
FIG. 4 is a block diagram illustrating a general architecture for a computer system that can be employed to implement various elements of the system shown in FIG. 1, the method shown in FIG. 2, and the functional block diagram shown in FIG. 3, among others, in accordance with an implementation.

FIG. 4 is a block diagram of a computer system 400 in accordance with an illustrative implementation. The computer system or computing device 400 can be used to implement the system 100, system 300, content provider 125, computing device 110, content publisher 115, data processing system 120, content selector 135, number allocator 140, multiplexer 145, bridging module 150, sensor 160, and data repository 155. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. Main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, is coupled to the bus 405 for persistently storing information and instructions.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. In alternative implementations, hard-wired circuitry may be used in place of or in combination with software instructions to effect illustrative implementations. Thus, implementations are not limited to any specific combination of hardware circuitry and software.

Although an example computing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources.

The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of selecting a communication identifier for a device of a content provider using a computer network, comprising:

receiving, by one or more processors of a data processing system, a request for content for display via a computing device;

identifying, by the data processing system responsive to the request, a content item provided by the content provider;

determining, by the data processing system, a feature of the computing device comprising at least one of a location of the computing device, a device type of the computing device, or a phone number of the computing device;

determining, by the data processing system, a feature of the content item previously identified by the data processing system;

inputting, by the data processing system, the feature of the computing device and the feature of the content item into a historical performance model generated by one of a neural network, regression, linear regression, and a Bayesian estimator and maintained by a machine learning engine of the data processing system;

identifying, by the data processing system responsive to inputting the feature of the computing device and the feature of the content item, a first weight for a first type of phone number and a second weight for a second type of phone number, selecting, by a number allocator executed by the data processing system and based on a comparison of the first weight and the second weight, the type of phone number for the content provider corresponding to a highest interaction level, the type of phone number corresponding to one of a local phone number, a phone number local to the computing device, or a toll-free phone number;

identifying, by the number allocator, a phone number for the content item corresponding to the selected type of phone number;

transmitting, by the data processing system via the computer network, the phone number for the content item to the computing device for display with the content item via the computing device;

identifying, by a multiplexer executing on the data processing system, responsive to receiving an indication to establish a communication channel corresponding to the phone number for the content item, a phone number for the device of the content provider using a multiplexing data structure, the phone number for the device different from the phone number for the content item; and establishing, by the data processing system, between the computing device and the device of the content provider, the communication channel corresponding to the phone number of the content item.

2. The method of claim 1, comprising:

receiving, by the data processing system, location information associated with the computing device; and determining, by the data processing system, the feature of the computing device based on the location information.

3. The method of claim 1, comprising:

determining, by the data processing system, the feature of the computing device based on the location for the computing device detected via a sensor of the computing device;

determining, by the data processing system, the feature of the content item based on a location stored in a content campaign data structure of the content item; and determining, by the data processing system, a distance metric based on the feature of the computing device and the feature of the content item; and selecting, by the data processing system, the type of phone number based on the distance metric satisfying a threshold.

4. The method of claim 1, comprising:
receiving, by the data processing system, a call from the computing device with a destination comprising the phone number of the content item;
establishing, by the data processing system, a first communication channel between the data processing system and the computing device;
performing, by the data processing system, a lookup in the multiplexing data structure to map the phone number with an identifier of the device of the content provider;
establishing, by the data processing system, a second communication channel between the data processing system and the device using the identifier; and
bridging, by the data processing system, the first communication channel with the second communication channel.

5. The method of claim 1, comprising:
retrieving, by the data processing system from a data structure stored in memory, the phone number for the content item corresponding to the type of phone number, the type of phone number including one of the toll-free phone number, a premium phone number, a shared cost phone number or a local number.

6. The method of claim 1, comprising:
determining, by the data processing system, from a content item data structure established with input received from the content provider, a value for a parameter indicating to minimize costs incurred by the computing device for the communication channel; and
selecting, by the data processing system responsive to the value, a toll-free number for the content item from a data structure stored in memory mapping the toll-free phone number, a premium phone number, a shared cost phone number and a local number to the phone number of the device of the content provider.

7. The method of claim 1, comprising:
determining, by the data processing system from a profile data structure, the feature of the computing device indicating a preference for the type of phone number;
determining, by the data processing system, that the feature of the content item corresponds to the feature of the computing device; and
selecting, by the data processing system, the phone number for the content item responsive to the feature of the computing device corresponding to the feature of the content item.

8. The method of claim 1, comprising:
determining, by the data processing system, the feature of the computing device based on at least one of the device type or a search query input into a search engine; and
determining, by the data processing system, the feature of the content item based on at least one of a keyword of a web page displaying the content item or a keyword of the content item.

9. A system to select a communication identifier for a device of a content provider using a computer network, comprising:
a data processing system having one or more processors and memory, the data processing system configured to:
receive a request for content for display via a computing device;
identify, responsive to the request, a content item provided by the content provider;
determine a feature of the computing device comprising at least one of a location of the computing device, a device type of the computing device, or a phone number of the computing device;
determine a feature of the content item previously identified by the data processing system;
input the feature of the computing device and the feature of the content item into a historical performance model generated by one of a neural network, regression, linear regression, and a Bayesian estimator and maintained by a machine learning engine of the data processing system;
identify, responsive to input of the feature of the computing device and the feature of the content item, a first weight for a first type of phone number and a second weight for a second type of phone number;
a number allocator executed by the data processing system configured to:
select, based on a comparison of the first weight and the second weight, the type of phone number for the content provider corresponding to a highest interaction level, the type of phone number corresponding to one of a local phone number, a phone number local to the computing device, or a toll-free phone number;
identify a phone number for the content item corresponding to the selected type of phone number; and
transmit, via the computer network, the phone number for the content item to the computing device for display with the content item via the computing device;
a multiplexer executed by the data processing system configured to identify, responsive to receiving an indication to establish a communication channel corresponding to the phone number for the content item, a phone number for the device of the content provider using a multiplex data structure, the phone number for the device different from the phone number for the content item; and
the data processing system configured to establish, between the computing device and the device of the content provider, the communication channel corresponding to the phone number of the content item.

10. The system of claim 9, comprising the data processing system configured to:
receive location information associated with the computing device; and
determine the feature of the computing device based on the location information.

11. The system of claim 9, comprising the data processing system configured to:
determine the feature of the computing device based on the location for the computing device detected via a sensor of the computing device;
determine the feature of the content item based on a location stored in a content campaign data structure of the content item; and
determine a distance metric based on the feature of the computing device and the feature of the content item; and
select the type of phone number based on the distance metric satisfying a threshold.

12. The system of claim 9, comprising the data processing system configured to:
receive a call from the computing device with a destination comprising the phone number of the content item;

establish a first communication channel between the data processing system and the computing device;

perform a lookup in a multiplexing data structure to map the phone number with an identifier of the device of the content provider;

establish a second communication channel between the data processing system and the device using the identifier; and bridge the first communication channel with the second communication channel.

13. The system of claim 9, comprising the data processing system configured to:

retrieve, from a data structure stored in memory, the phone number for the content item corresponding to the type of phone number, the type of phone number including one of the toll-free phone number, a premium phone number, a shared cost phone number or a local number.

14. The system of claim 9, comprising the data processing system configured to:

determine from a content item data structure established with input received from the content provider, a value for a parameter indicating to minimize costs incurred by the computing device for the communication channel; and select, responsive to the value, a toll-free number for the content item from a data structure stored in memory mapping the toll-free phone number, a premium phone number, a shared cost phone number and a local number to the phone number of the device of the content provider.

15. The system of claim 9, comprising the data processing system configured to:

determine, from a profile data structure, the feature of the computing device indicating a preference for the type of phone number;

determine that the feature of the content item corresponds to the feature of the computing device; and select the phone number for the content item responsive to the feature of the computing device corresponding to the feature of the content item.

16. The system of claim 9, comprising the data processing system configured to:

determine the feature of the computing device based on at least one of the device type or a search query input into a search engine; and determine the feature of the content item based on at least one of a keyword of a web page displaying the content item or a keyword of the content item.

* * * * *